(12) United States Patent
Tsukamoto et al.

(10) Patent No.: US 6,761,744 B1
(45) Date of Patent: Jul. 13, 2004

(54) LITHIUM THIN FILM LAMINATION TECHNOLOGY ON ELECTRODE TO INCREASE BATTERY CAPACITY

(75) Inventors: Hisashi Tsukamoto, Saugus, CA (US); Chananit Sintuu, Houston, TX (US)

(73) Assignee: Quallion LLC, Sylmar, CA (US)

( * ) Notice: Subject to any disclaimer, the term of this patent is extended or adjusted under 35 U.S.C. 154(b) by 237 days.

(21) Appl. No.: 10/031,022

(22) PCT Filed: Jul. 14, 2000

(86) PCT No.: PCT/US00/19348

§ 371 (c)(1),
(2), (4) Date: Jan. 14, 2002

(87) PCT Pub. No.: WO01/06578

PCT Pub. Date: Jan. 25, 2001

Related U.S. Application Data

(60) Provisional application No. 60/144,146, filed on Jul. 16, 1999.

(51) Int. Cl.$^7$ .............................................. H01M 10/38
(52) U.S. Cl. ................. 29/623.3; 29/623.5; 429/231.95
(58) Field of Search ............................ 29/623.3, 623.5; 429/231.95, 231.1

(56) References Cited

U.S. PATENT DOCUMENTS

| | | |
|---|---|---|
| 3,757,793 A | 9/1973 | Fester et al. |
| 4,025,700 A | 5/1977 | Fagan, Jr. et al. |
| 4,136,234 A | 1/1979 | Fritts |
| 4,259,415 A | 3/1981 | Tamura et al. |

(List continued on next page.)

FOREIGN PATENT DOCUMENTS

| | | |
|---|---|---|
| CA | 2203490 A | 10/1998 |
| DE | 198 39 244 A1 | 3/1999 |
| EP | 1 282 179 A2 | 2/2003 |
| JP | 60-235372 A | 11/1985 |
| JP | 61-294756 | 12/1986 |
| JP | 62-080975 A2 | 4/1987 |
| JP | 07-235330 | 9/1995 |
| JP | 09-27345 | 1/1997 |
| JP | 09-293499 A2 | 11/1997 |
| JP | 10-302839 | 11/1998 |
| JP | 11-111267 | 7/1999 |
| JP | 2002042863 A2 | 2/2002 |

(List continued on next page.)

OTHER PUBLICATIONS

M. Wachtler et al., Anodic Materials for Rechargeable Li–Batteries, Journal of Power Sources, 2002, 105, 151–160. (No Month).

*Primary Examiner*—John S. Maples
(74) *Attorney, Agent, or Firm*—M. Elizabeth Bush

(57) ABSTRACT

Lithium is laminated onto or into an electrode structure comprising a metal conducting layer with an active material mixture of, for example, a nano-composite of silicon monoxide, together with graphite and a binder, such as polyvinyl di-fluoride (PVDF). The lamination of lithium metal onto or into the electrode structure will reduce the amount of irreversible capacity by readily supplying a sufficient amount of lithium ions to form the initial solid electrolyte interface. In order to laminate lithium metal onto or into the negative electrode, the lithium is first deposited onto a carrier, which is then used to laminate the lithium metal onto or into the electrode structure. The next step is placing the coated electrode material and the lithium-deposited plastic between two rollers or two plates. Plates are heated to about 120° C. or within the range of 25° C. to 250° C. A pressure of 50 kg/cm$^2$ to 600 kg/cm$^2$ is applied to the rollers. The speed of movement of the materials through the roller pair or the plate pair is in the range of 10 cm/min. The method can be used for either single-sided or double-sided coating. Using this technology alone, the battery capacity can increase by 7% to 15%.

8 Claims, 4 Drawing Sheets

U.S. PATENT DOCUMENTS

| | | | |
|---|---|---|---|
| 4,388,380 A | 6/1983 | DeHaan et al. |
| 4,399,202 A | 8/1983 | Ikeda et al. |
| 4,403,020 A | 9/1983 | Dampier |
| 4,416,957 A | 11/1983 | Goebel et al. |
| 4,418,129 A | 11/1983 | Goebel |
| 4,448,864 A | 5/1984 | Broussely |
| 4,502,903 A | 3/1985 | Bruder |
| 4,515,873 A | 5/1985 | DeHaan |
| 4,543,304 A | 9/1985 | DeHaan |
| 4,544,613 A | 10/1985 | DeHaan |
| 4,581,305 A | 4/1986 | Jones et al. |
| 4,615,959 A | 10/1986 | Hayashi et al. |
| 4,619,874 A | 10/1986 | Skarstad et al. |
| 4,622,277 A | 11/1986 | Bedder et al. |
| RE33,306 E | 8/1990 | Hayashi et al. |
| 5,180,642 A | 1/1993 | Weiss et al. |
| 5,209,994 A | 5/1993 | Blattenberger et al. |
| 5,569,553 A | 10/1996 | Smesko et al. |
| 5,624,767 A | 4/1997 | Muffoletto et al. |
| 5,667,916 A | 9/1997 | Ebel et al. |
| 5,747,103 A | 5/1998 | Mitchell, Jr. et al. |
| 5,882,218 A | 3/1999 | Reimers |
| 5,948,569 A | 9/1999 | Moses et al. |
| 6,030,421 A | 2/2000 | Gauthier et al. |
| 6,045,941 A | 4/2000 | Milewits |
| 6,371,995 B1 | 4/2002 | Yasunami |
| 6,495,287 B1 | 12/2002 | Kolb et al. |
| 2002/0050054 A1 | 5/2002 | Noh |
| 2002/0061446 A1 | 5/2002 | Gan et al. |
| 2002/0187398 A1 | 12/2002 | Mikhaylik et al. |
| 2003/0003362 A1 | 1/2003 | Leising et al. |

FOREIGN PATENT DOCUMENTS

| | | |
|---|---|---|
| WO | WO 96/27908 A | 9/1996 |
| WO | WO 96/27908 A1 | 9/1996 |
| WO | WO 96/27912 A1 | 9/1996 |
| WO | WO 01/06578 A3 | 1/2001 |
| WO | WO 01/06578 A2 | 1/2001 |

LITHIUM THIN FILM LAMINATION TECHNOLOGY ON ELECTRODE TO INCREASE BATTERY CAPACITY

This application is a 371 of PCT/US00/19348 filed Jul. 14, 2000 which claims benefit of provisional application 60/144,146, filed Jul. 16, 1999.

FIELD OF THE INVENTION

This invention relates to a method and apparatus for reducing the irreversible capacity of a rechargeable battery, in particular lithium ion batteries, in order to increase the battery's overall energy storage capacity.

BACKGROUND OF THE INVENTION

Batteries typically exhibit irreversible capacities after the initial cycle of charging. The significant capacity lost in the first cycle results in a loss in overall battery storage capacity. The irreversible capacity is due to the formation of the solid electrolyte interface (SEI) layer in typical negative electrodes from the first cycle of charging. However, other forms of irreversible capacity may be due to additional reasons, for example, cavities in the active material of the electrode structure may need to be initially filled with lithium ions before lithium ion insertion can proceed.

SUMMARY OF THE INVENTION

The present invention is directed to a method and apparatus for reducing the irreversible capacity of a lithium ion battery by initially depositing a layer of lithium metal onto or into the electrode structure. The deposited lithium serves to form the initial SEI layer before cycling to thus reduce the amount of irreversible capacity and increase the overall battery storage capacity.

A typical electrode structure is comprised of a conducting metal substrate coated with an active material mixture. For example, a typical negative electrode consists of a copper substrate coated with a mixture of graphite and a binder such as polyvinyl di-fluoride (PVDF). In accordance with the present invention, a lithium layer is deposited onto or into the electrode active material to reduce the amount of irreversible capacity by filling voids in the active material that do not participate in the reversible lithium ion insertion process.

In accordance with a preferred embodiment, lithium metal is first deposited onto a carrier, which is then used to transfer the lithium metal to the electrode structure by the application of heat, vacuum and/or pressure. The carrier preferably comprises a long strip of plastic substrate that is preferable for a continuous transfer of lithium onto or into the electrode. In addition, this approach lends itself to commercial production. The substrate could be one of several materials such as ortho-polypropylene (OPP), Polyethylene Terephthalate (PET), polyimide, or other type of plastic. Lithium metal can be deposited onto or into one or both surfaces of the substrate. The lithium-coated plastic and the electrode material are then placed between two rollers or two plates. Lithium is transferred onto or into the electrode active material by applying heat and/or pressure in vacuum. In a preferred embodiment, the rollers or plates are heated in vacuum to about 120° C., or within the range of 25° C. to 350° C. and a pressure of 50 kg/cm² to 600 kg/cm² is applied to the rollers or plates.

The speed of movement of the carrier electrode material through the roller pair or the plate pair is in the range of 10 cm/min. to 5 m/min. For a given speed, the length of time the materials are exposed to the heat and pressure rollers, or alternatively the heat and pressure plates, will be fixed, depending only on the lengthwise distance of the plate along the direction of the material movement. For the roller pair, deformation of the rollers results in distance in the direction of travel of the material, which adds to the actual contact time of pressure and temperature application.

The method could be used with electrodes having either single-sided coating or double-sided coating in the double-sided coating method, both sides of the metal substrate are coated with active material. The coated metal substrate is then sandwiched between two lithium-coated plastic carriers, with the lithium sides facing the active material on the coated metal substrate. All three sheets are then fed into a mechanism for applying heat and/or pressure in vacuum. As a result, lithium is transferred to both sides of the coated metal substrate.

The thickness of lithium transferred onto the electrode structure can be controlled to produce a lithium coating between about 50 Angstroms and 0.3 millimeters. Using this technology, it is expected to increase a lithium ion battery capacity by about 7% to 15%.

BRIEF DESCRIPTION OF THE DRAWINGS

The above and other features and advantages of the invention will be more apparent from the following detailed description wherein.

DESCRIPTION OF THE PREFERRED EMBODIMENTS

The following text describes the preferred mode presently contemplated for carrying out the invention and is not intended to describe all possible modifications and variations consistent with the spirit and purpose of the invention. This description is not to be taken in a limiting sense, but is merely made for the purpose of describing the general principles and preferred manner of practicing the invention. The scope of the invention should be determined with reference to the claims.

The objective of this invention is to significantly reduce the irreversible capacity produced mainly from the first cycle life of the active material of an electrode. A reduction in the irreversible capacity will ultimately lead to an overall increase in battery capacity. Lithium is transferred to the electrode by lamination of lithium metal onto or into an electrode structure. This electrode structure has a metal conducting layer coated with an active material. For example, negative active material is typically a mixture of graphite and PVDF. The lamination of lithium metal onto or into the electrode structure will reduce the amount of irreversible capacity by readily supplying sufficient lithium to fill any voids in the active material, which do not participate in the reversible lithium insertion process.

Figure 1:
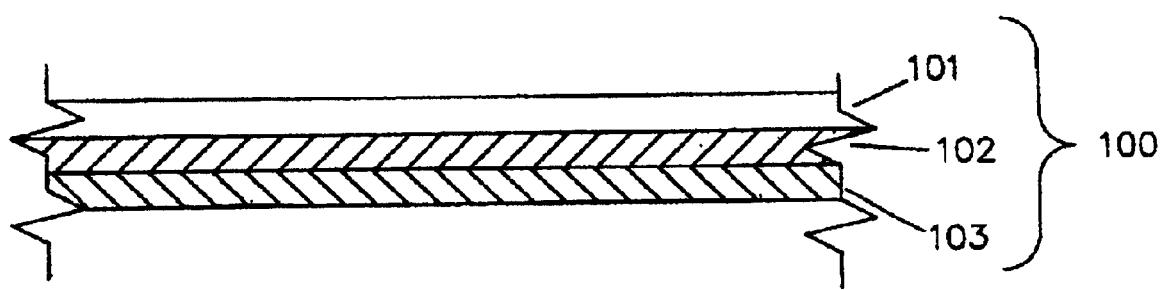
FIG. 1 shows the electrode structure coated with active material.

FIG. 1 shows the structure of an electrode (100), having a lithium coating (101) in accordance with the present invention. The substrate (103) for negative electrodes is usually copper foil but other types of material such as a copper-plated polymer may be used. However, it must be noted that the substrate should not react with lithium metal, which is why copper is most often used as the negative electrode substrate. The metal of the electrode may be coated with, for example, a mixture of graphite and silicon oxide (102). A suitable mixture of about 20% SiO nanocomposite and 80% graphite for a negative electrode has an ability to create a capacity of about 500 mAh/g as compared to graphite's theoretical capacity of 372 mAh/g. This results in a significant increase in the rechargeable capacity. However, such a mixture also has significant irreversible capacity, making the present invention greatly beneficial for such an electrode.

Figure 2:
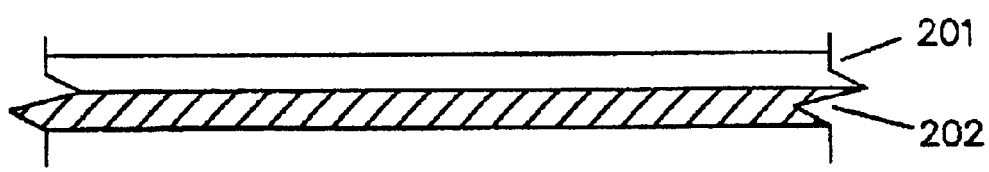
FIG. 2 shows the structure of the film of lithium metal deposited on the plastic substrate.

In order to laminate lithium metal (FIG. 2, 201) to the electrode (100), the lithium (201) is deposited onto a carrier (202), which is then used to apply the lithium metal to the electrode structure. The carrier preferably comprises a long strip of plastic substrate.

Figure 3B:
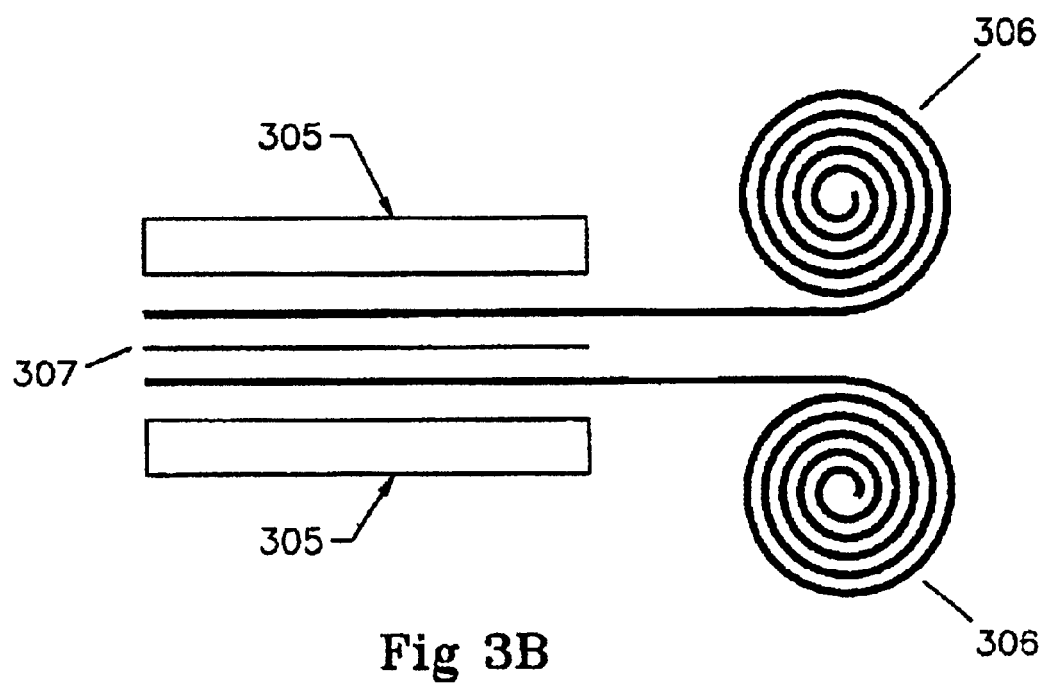
FIG. 3B shows the plate pair system that will be used to transfer the lithium from the carrier to the electrode by applying heat and/or pressure in a vacuum atmosphere.
Figure 3A:
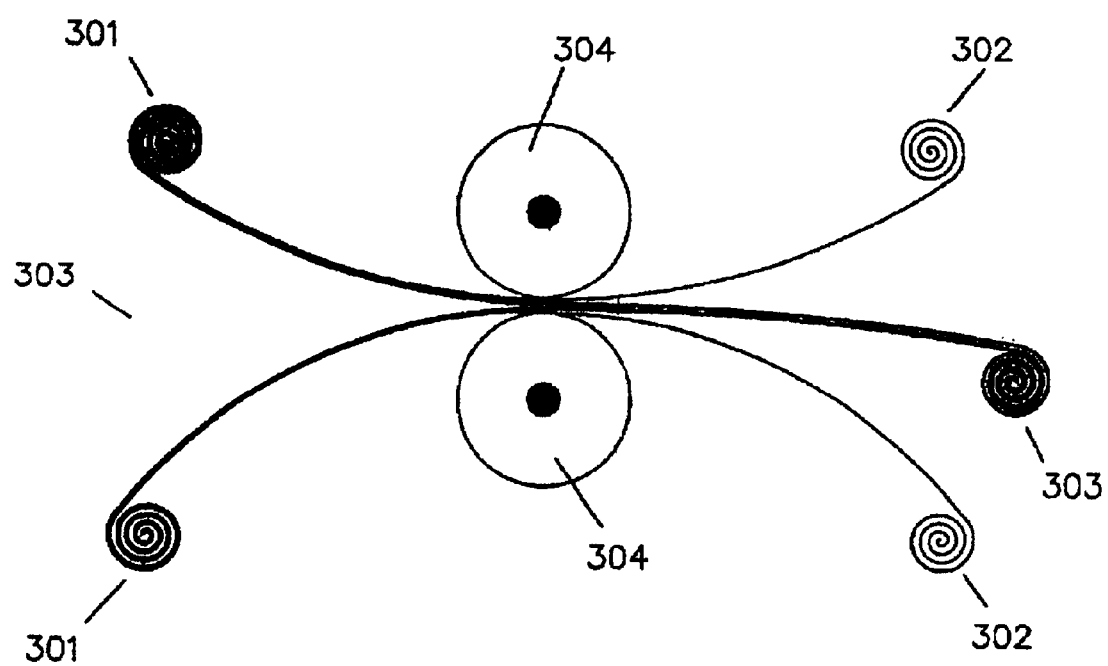
FIG. 3A shows the roller pair system that will be used to transfer the lithium from the carrier to the electrode by applying heat and pressure in vacuum.

FIG. 3A details the process in which lithium will be transferred from the carrier substrate to the electrode. The left side of the figure is prior to lithium printing, while the right side is after lithium printing. The preferred embodiment consists of two rollers (305) or plates (FIG. 3B, 306) with lithium plus carrier substrate (301) placed between the two rollers or plates. In addition, pressure will be applied to the rollers (FIG. 3A, 305), or plates (FIG. 3B, 306) and as the electrode (303) and lithium-deposited carrier substrate (301) move through the rollers (304), or plates, the lithium metal (201) will be laminated onto or into the electrode (100).

Figure 4:
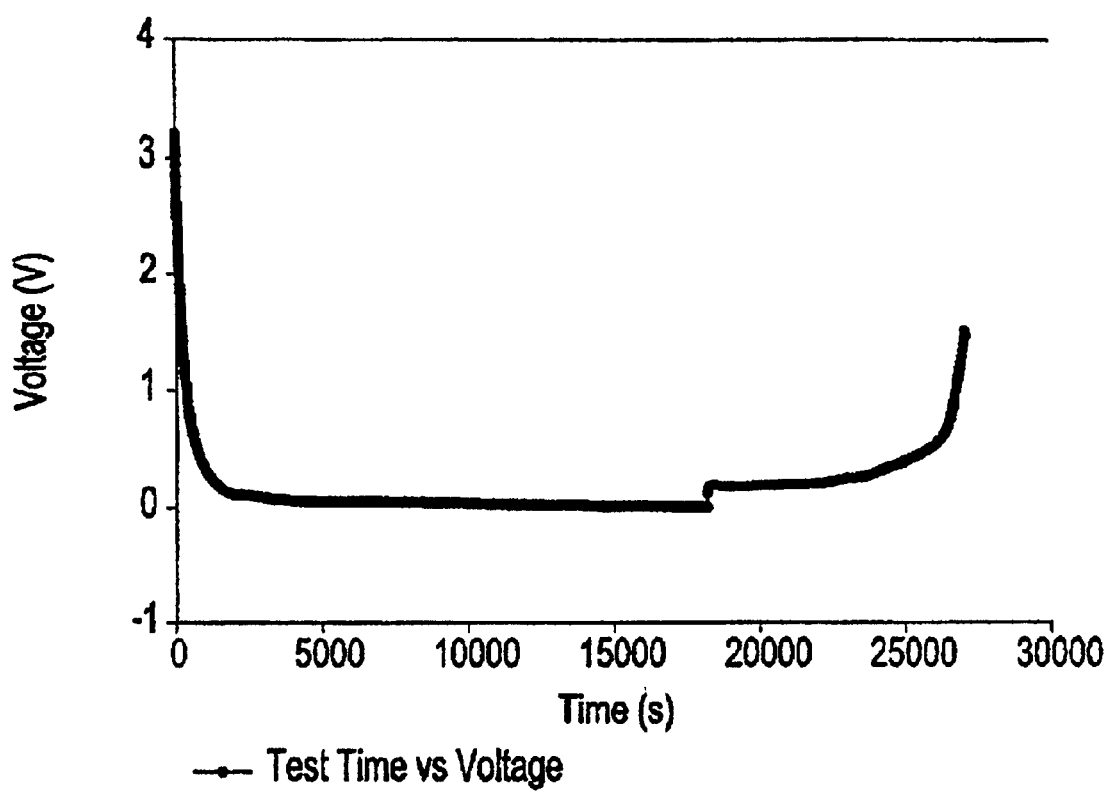
FIG. 4 shows the first cycle of an example negative electrode, a SiO nano-composite electrode that has not been laminated with lithium.

FIG. 4 is a graph of the first cycle of a SiO nanocomposite cell that has not been initially laminated with lithium metal. If the discharge curve is transposed along an imaginary axis, it is clear that there is a large initial irreversible capacity that must be reduced in order to increase battery capacity.

While the invention herein disclosed has been described by means of specific embodiments and applications thereof, numerous modifications and various could be made thereto by those skilled in the art without departing from the scope of the invention set forth in the claims.

What is claimed is:

1. A method to laminate lithium onto an electrode comprising the steps of:
   (a) utilizing an electrode structure including a substrate coated with active material;
   (b) utilizing a lithium coated plastic sheet;
   (c) pressing the said electrode material and said lithium coated sheet together using a pair of pressing structures;
   (d) moving said electrode structure and lithium coated sheet through the pressing structures; and
   (e) applying pressure and heat in vacuum to said electrode structure and said lithium coated sheet while moving them through said pressing structures.

2. The method of claim 1 further comprising the step of utilizing the said laminated electrode in lithium or lithium ion batteries.

3. The method of claim 1 further comprising the step of utilizing a pair of rollers as the pressing structures.

4. The method of claim 1 further comprising the step of utilizing a pair of plates as the pressing structures.

5. The method of claim 1 further comprising the step of applying heat at a temperature within the range 25° C. to 250° C.

6. The method of claim 1 further comprising the step of applying pressure in the range of 50 kg/cm$^2$ to 600 kg/cm$^2$ utilizing said pressure structures.

7. A method for increasing the storage capacity of a lithium ion battery including the steps of:
   (a) providing an electrode structure comprised of a metal substrate coated with active material; and
   (b) depositing lithium onto or into said active material to reduce cavities therein; wherein said depositing step includes:
   (b1) providing a sheet carrier bearing a layer of lithium metal; and
   (b2) pressing said layer of lithium metal against said active material to transfer lithium onto or into said active material.

8. The method of claim 7 wherein said depositing step further includes:
   (a) applying heat and/or pressure in vacuum to said carrier and/or said electrode structure to facilitate transfer of said lithium.

* * * * *